(12) United States Patent
Bradfield

(10) Patent No.: US 8,446,056 B2
(45) Date of Patent: May 21, 2013

(54) ELECTRIC MACHINE COOLING SYSTEM AND METHOD

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 72 days.

(21) Appl. No.: 12/893,698

(22) Filed: Sep. 29, 2010

(65) Prior Publication Data

US 2012/0074799 A1  Mar. 29, 2012

(51) Int. Cl.
*H02K 1/20* (2006.01)

(52) U.S. Cl.
USPC ................................................ 310/58; 310/54

(58) Field of Classification Search
USPC ............... 310/52, 54, 57–59, 60 A, 64, 89
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,009,072 A * | 11/1961 | Mossay | 310/57 |
| 3,110,827 A * | 11/1963 | Baudry | 310/55 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,264,834 A * | 4/1981 | Armor et al. | 310/59 |
| 4,442,371 A * | 4/1984 | Utsunomiya et al. | 310/260 |
| 4,598,223 A * | 7/1986 | Glennon et al. | 310/260 |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,363,002 A * | 11/1994 | Hernden et al. | 310/54 |
| 5,372,213 A | 12/1994 | Hasebe et al. | |
| 5,519,269 A | 5/1996 | Lindberg | |
| 5,534,736 A | 7/1996 | Johnson | |
| 5,616,973 A | 4/1997 | Khazanov | |
| 5,744,880 A * | 4/1998 | Kudoh et al. | 310/58 |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |
| 6,011,332 A | 1/2000 | Umeda et al. | |

(Continued)

FOREIGN PATENT DOCUMENTS

JP  05-103445 A  4/1993
JP  05-292704 A  11/1993

(Continued)

OTHER PUBLICATIONS

International Search Report, Received Apr. 24, 2012.

(Continued)

*Primary Examiner* — Dang Le
(74) *Attorney, Agent, or Firm* — Greenberg Traurig LLP

(57) ABSTRACT

Embodiments of the invention provide an electric machine module comprising an electric machine with a stator and housing at least partially circumscribing the electric machine. The housing includes at least two housing members coupled together and substantially securing the electric machine within the housing. The electric machine module also includes a coolant jacket at least partially defined by an outer diameter of the stator and an inner diameter portion of the housing.

17 Claims, 3 Drawing Sheets

U.S. PATENT DOCUMENTS

| | | |
|---|---|---|
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,617,716 B2 * | 9/2003 | Ishida .................... 310/58 |
| 6,770,999 B2 | 8/2004 | Sakuraki |
| 6,897,594 B2 | 5/2005 | Ichikawa et al. |
| 6,903,471 B2 | 6/2005 | Arimitsu et al. |
| 6,919,656 B2 * | 7/2005 | Soitu et al. .............. 310/58 |
| 6,998,749 B2 | 2/2006 | Wada et al. |
| 7,002,267 B2 | 2/2006 | Raszkowski et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,518,271 B2 * | 4/2009 | Braun et al. ............. 310/62 |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0174278 A1 | 7/2009 | Sheaffer et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 2008-544733 A | 12/2008 |
| JP | 2009-247084 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report, mailed Jul. 31, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

ELECTRIC MACHINE COOLING SYSTEM AND METHOD

BACKGROUND

Conventional oil-cooled electric machine modules include a steel canister into which an electric machine is mounted. The steel canister in turn is mounted into a cast aluminum housing. There is an intentional radial gap of several millimeters between the outer diameter of the steel canister and the inner diameter of the cast aluminum housing. This creates an oil jacket that traditionally surrounds the outer diameter of the stator lamination stack. Oil flows into this jacket region from a single inlet, splits into two flows, flows circumferentially around the oil jacket, and then exits from the oil jacket through a series of holes in the steel canister. The holes often point toward stator end turns of the electric machine so that the oil sprays on each stator end turn. By gravity, the oil then flows down to a drain around the bottom of the electric machine.

SUMMARY

Some embodiments provide an electric machine module including an electric machine with a stator and a housing at least partially circumscribing the electric machine. The housing includes at least two housing members coupled together and substantially securing the electric machine within the housing. The electric machine module can also include a coolant jacket at least partially defined by an outer diameter of the stator and an inner diameter portion of the housing.

Some embodiments provide an electric machine module including an electric machine with a stator and a housing at least partially circumscribing the electric machine. The housing includes at least two housing members coupled together and substantially securing the electric machine within the housing. The housing also includes indentations positioned near axial ends of the stator and substantially along a circumference of the stator. The indentations provide an axial flow path substantially following a portion of an outer diameter of the stator and a radial flow path substantially following a portion of an axial side of the stator.

Some embodiments provide a method for cooling an electric machine module. The method may include providing an electric machine including a stator with stator end turns and providing a housing defining a machine cavity and at least partially circumscribing the electric machine. The housing can include at least two housing members coupled together, where at least one of the at least two housing members can include a coolant inlet and a coolant passageway. The method can also include providing a coolant jacket at least partially defined by an outer diameter of the stator and an inner diameter portion of the housing and positioning a plurality of apertures substantially circumferentially around the coolant jacket. The coolant passageway can fluidly connect the coolant inlet and the coolant jacket, and the plurality of apertures can be in fluid communication with at least the machine cavity and the coolant jacket. The method can further include introducing a coolant into the coolant inlet, circulating the coolant through the coolant passageway and into the coolant jacket, and forcing at least a portion of the coolant through the plurality of apertures into the machine cavity.

DETAILED DESCRIPTION

Figure 1:
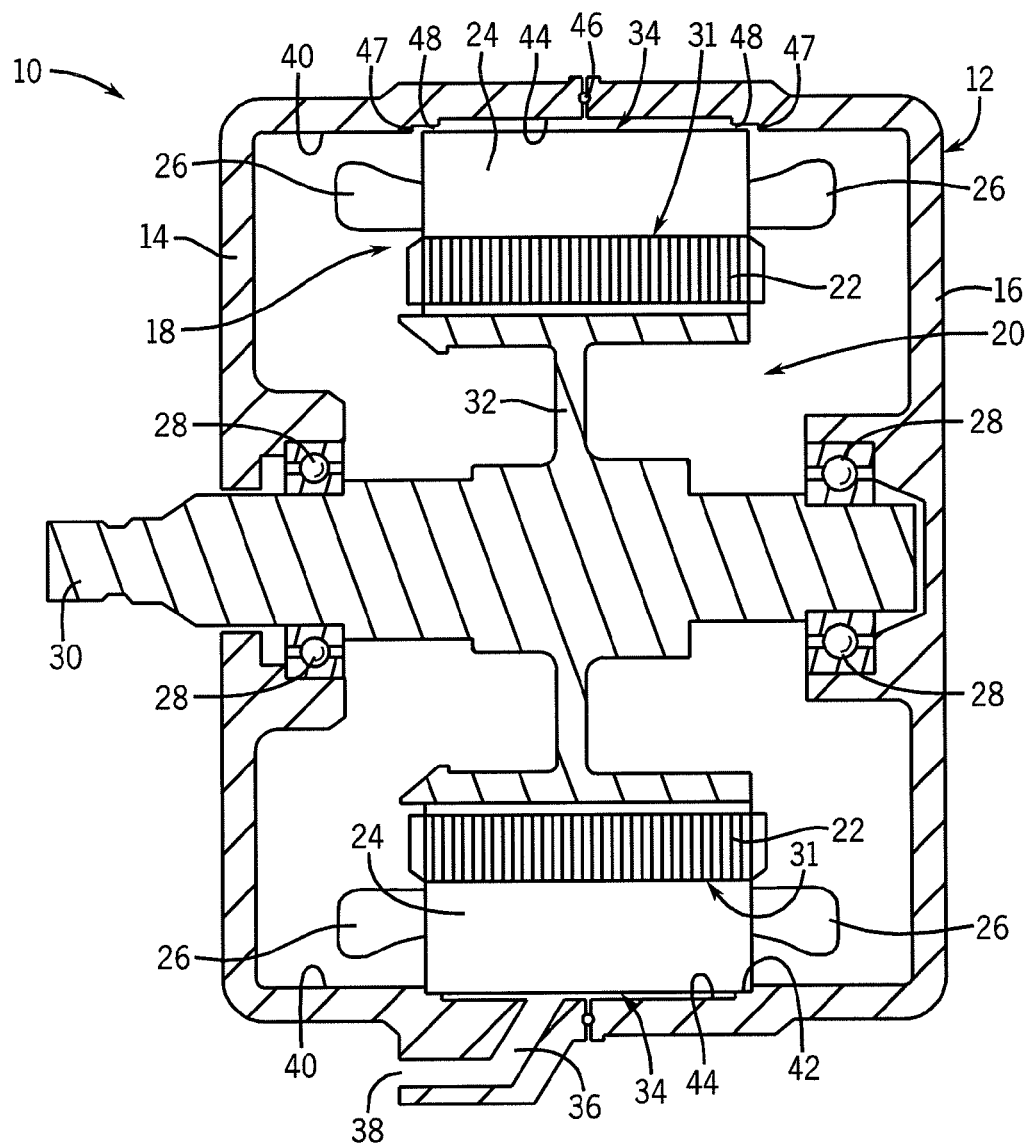
FIG. 1 is a front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a portion of an electric machine module 10 according to one embodiment of the invention. The electric machine module 10 can include a housing 12 comprising a first housing member 14 and a second housing member 16. In some embodiments, more than two housing members can be employed (not shown). An electric machine 18 can be housed within a machine cavity 20 at least partially defined by the housing members 14, 16. The housing 12 can at least partially circumscribe the electric machine 18. The housing members 14, 16 can be coupled via one or more fasteners (not shown) or another suitable coupling manner, to enclose the electric machine 18 within the machine cavity 20. In some embodiments, the housing members 14, 16 can comprise cast aluminum. Also, in some embodiments, the housing members 14, 16 can be portions of a transmission housing (not shown).

The electric machine 18 can include a rotor 22, a stator 24, stator end turns 26, and bearings 28, and can be disposed about a main output shaft 30. The stator 24 can circumscribe the rotor 22, and a radial air gap 31 can exist between the rotor 22 and the stator 24. In some embodiments, the electric machine 18 also can include a rotor hub 32 or can have a "hub-less" design (not shown). The electric machine 18 can be, without limitation, an electric motor, such as a hybrid electric motor, an electric generator, or a vehicle alternator. In one embodiment, as shown in FIG. 1, the electric machine 18 can be an induction belt-alternator-starter (BAS). In another embodiment, the electric machine 18 can be a High Voltage Hairpin (HVH) electric motor for use in a hybrid vehicle.

Components of the electric machine 18 such as, but not limited to, the stator 24, the stator end turns 26 and the rotor 22 can generate heat during operation of the electric machine 18. These components can be cooled to enhance the performance of and increase the lifespan of the electric machine 18.

As shown in FIG. 1, the electric machine module 10 can include a coolant jacket 34. In some embodiments, a portion of the coolant jacket 34 can be cast into each housing member 14, 16. For example, as shown in FIGS. 1 and 2B-2D, the coolant jacket 34 can be formed between an outer diameter of the stator 24 and inner diameter portions of the housing members 14, 16. A coolant, such as motor oil, hydraulic fluid oil, or a similar fluid can be circulated through the coolant jacket 34 to help cool the stator 24. In some embodiments, forming the coolant jacket 34 using the stator and the housing members 14, 16 can eliminate the need for a separate canister or sleeve member, as is used in some conventional electric machine modules.

The coolant can be introduced into the coolant jacket 34 through a coolant passageway 36. More specifically, the coolant passageway 36 can fluidly connect the coolant jacket 34 with a coolant inlet 38. In some embodiments, the coolant passageway 36 and the coolant inlet 38 can be integral with one of the housing members 14, 16. For example, as shown in FIGS. 1 and 2B, the coolant passageway 36 and the coolant inlet 38 can be formed within the first housing member 14. The coolant inlet 38 can be in fluid communication with a fluid source via a conventional connection hose or similar (not shown).

In some embodiments, the housing members 14, 16 can have substantially equal axial lengths. As a result, the housing members 14, 16 can be coupled together near a central point along an axial length the stator 24. In other embodiments, the housing members 14, 16 can have different axial lengths. The housing members 14, 16, can be coupled at the central point or different points along the axial length of the stator 24 so that both the housing members 14, 16 can form the coolant jacket 34 with the stator. The housing members 14, 16 can each be press-fit or friction-fit against axial ends and/or axial sides of the stator 24, as shown in FIG. 1, to substantially provide a seal between the coolant jacket 34 and the machine cavity 20, as well as help secure or axially position the electric machine 18 within the machine cavity 20. More specifically, the housing members 14, 16 can have a first inner diameter 40 that is smaller than the outer diameter of the stator 24 (e.g., forming an inner wall inside the machine cavity 20), a second inner diameter 42 substantially equal to the outer diameter of the stator 24 (e.g., substantially forming the seal between the coolant jacket 34 and the machine cavity 20), and a third inner diameter 44 larger than the outer diameter of the stator 24 (e.g., forming a wall of the coolant jacket 34). As shown in FIG. 1, an o-ring 46 can be positioned to provide a seal between the housing members 14, 16 so that the coolant inside the coolant jacket 34 is substantially prevented from leaking outside the housing 12.

Figure 2A:
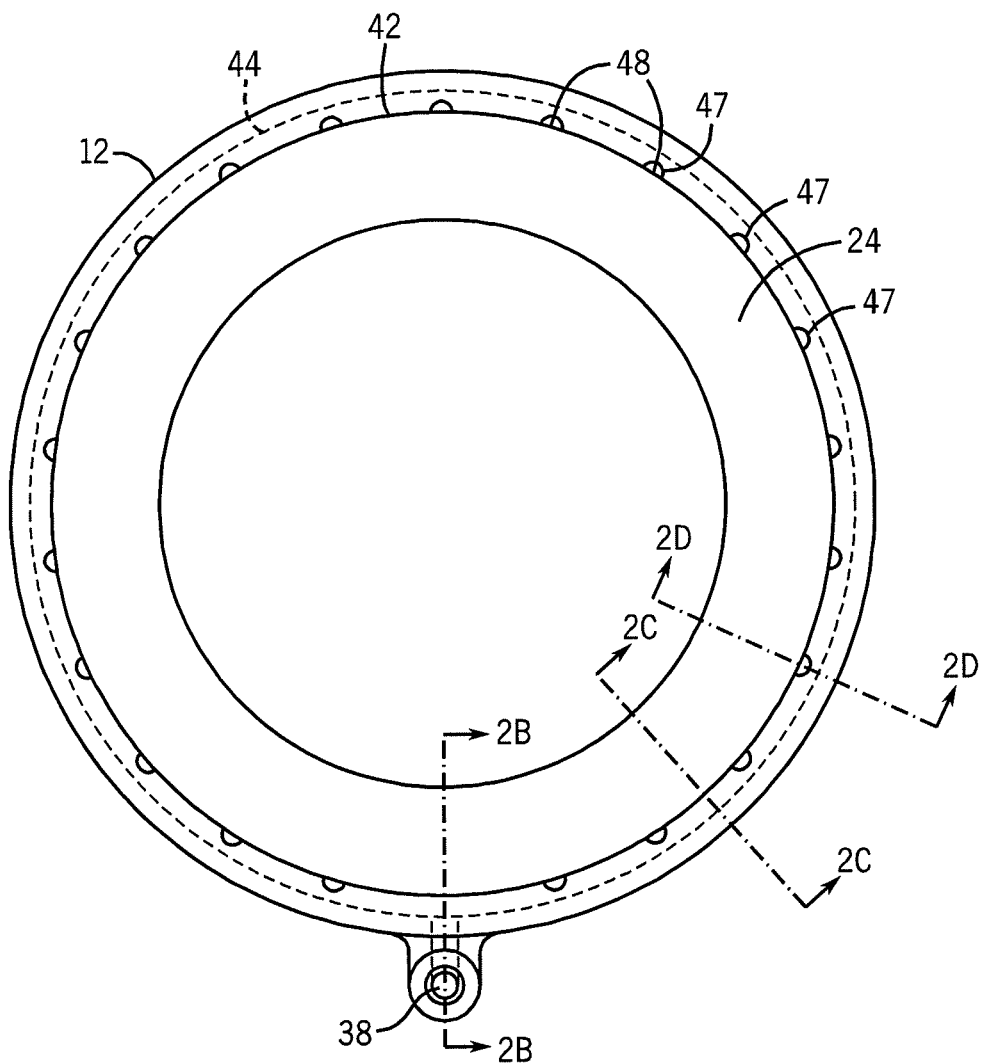
FIG. 2A is a side cross-sectional view of the electric machine module of FIG. 1.
Figure 2B:
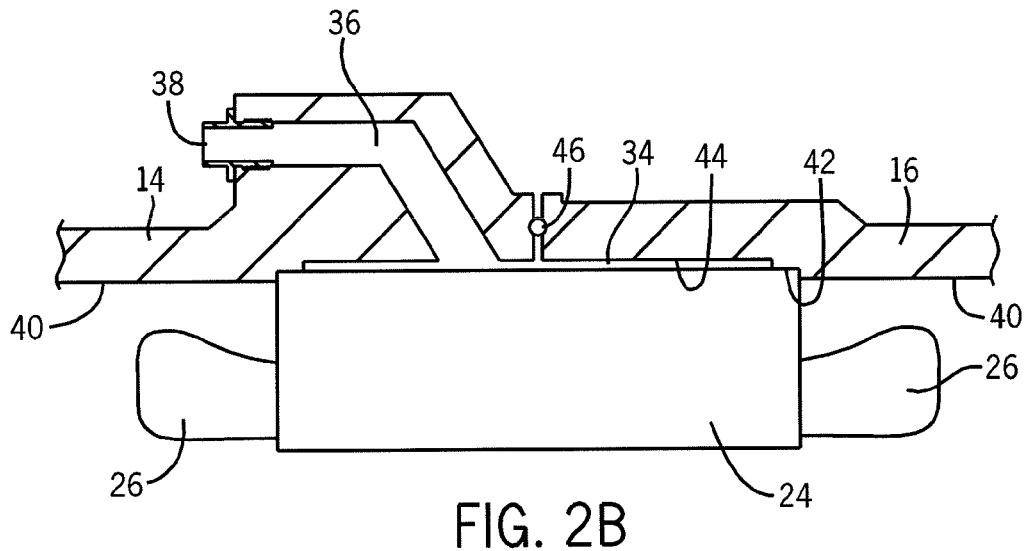
FIG. 2B is a partial front cross-sectional view of the electric machine module of FIG. 2 along line segment A-A.
Figure 2C:
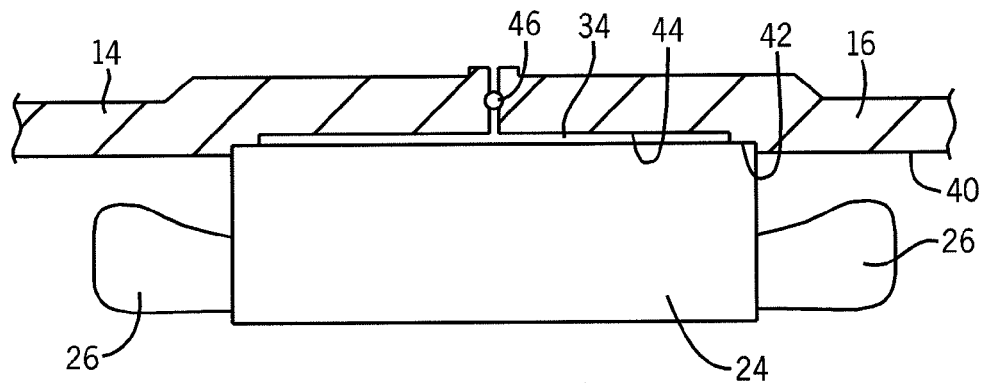
FIG. 2C is a partial front cross-sectional view of the electric machine module of FIG. 2 along line segment B-B.
Figure 2D:
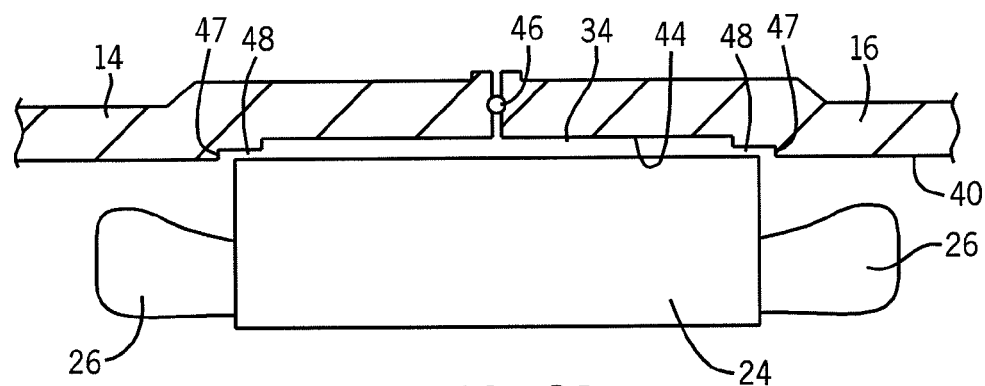
FIG. 2D is a partial front cross-sectional view of the electric machine module of FIG. 2 along line segment C-C.

In some embodiments, the housing members 14, 16 can include a plurality of cast indentations 47 positioned at axial ends of the coolant jacket 34, as shown in FIGS. 1, 2A, and 2D. The indentations 47 can provide a plurality of spray slots or apertures 48 between the housing members 14, 16 and the stator 24 when the electric machine 18 is positioned within the housing 12. As shown in FIG. 2A, the plurality of apertures 48 can be positioned circumferentially around the coolant jacket 34. As shown in FIGS. 1 and 2D, each of the plurality of apertures 48 can extend axially from the coolant jacket 34 along outer edges of the stator 24 and then radially inward to permit fluid communication between the coolant jacket 34 and the machine cavity 20. Due to the radially-inward turn in each of the plurality of apertures 48, the coolant flowing through the apertures 48 can be dispersed onto or near the stator end turns 26 in order to help cool the stator end turns 26. Due to the 90-degree bend in the radially-inward turn of each of the plurality of apertures 48, the pressure drop across the plurality of apertures 48 can be much higher than straight apertures or slots. As a result, the housing 12 can include more apertures 48 to more evenly cool the stator end turns 26, compared to housings with straight apertures.

During operation of the electric machine 18, the coolant can be dispersed into the coolant jacket 34 through the coolant inlet 38 and the coolant passageway 36. The coolant can split into two flows and flow circumferentially around the coolant jacket 34 to help cool the stator 24. At least a portion of the coolant can exit from the coolant jacket 34 by being forced (i.e., by fluid pressure within the coolant jacket 34) through the apertures 48 and spray onto or near the stator end turns 26 to help cool the stator end turns 26. After being dispersed into the machine cavity 20 onto or near the stator end turns 26, the coolant can flow toward a bottom of the machine cavity 20 due to gravity, cooling the electric machine components such as, but not limited to, the rotor 22, the stator 24, the rotor hub 32, and the bearings 28 as it flows downward. A drain (not shown) can be positioned near the bottom of the machine cavity 20 to expel the coolant back to the fluid source where it can be cooled and circulated back to the coolant jacket 34.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. An electric machine module comprising:
an electric machine including a stator;
a housing at least partially circumscribing the electric machine, the housing including at least two housing members including a first housing member and a second housing member coupled together and substantially securing the electric machine within the housing, the housing at least partially defining a machine cavity;
a coolant jacket at least partially defined by an outer surface of the outer diameter of the stator and an inner surface of an inner diameter portion of the first housing member and an inner surface of an inner diameter portion of the second housing member, the coolant jacket covering at least a majority of the outer surface area of the stator and extending substantially continuously across an axial length of the stator to a region substantially adjacent to each axial end of the stator; and
a plurality of cooling apertures defined between a portion of the stator and the housing, the plurality of coolant apertures being in fluid communication with the coolant jacket and the machine cavity.

2. The electric machine module of claim 1, wherein
the plurality of apertures extend away from the coolant jacket in at least a substantially axially outward direction and a substantially radially inward direction.

3. The electric machine module of claim 2, wherein each of the at least two housing members includes at least a first inner diameter, a second inner diameter, and a third inner diameter;
the first inner diameter smaller than the outer diameter of the stator;
the second inner diameter substantially equal to the outer diameter of the stator; and
the third inner diameter larger than the outer diameter of the stator, wherein the inner diameter portion of the housing which at least partially defines the coolant jacket includes the third inner diameter.

4. The electric machine module of claim 2, wherein the housing includes a coolant inlet and a coolant passageway, the coolant passageway fluidly connecting the coolant jacket and the coolant inlet.

5. The electric machine module of claim 2, wherein
the first housing member and the second housing member comprise substantially equal axial lengths; and
the first housing member and the second housing member are coupled together near a central point along an axial length of the stator.

6. The electric machine module of claim 1, and further comprising a drain positioned near the bottom of the machine cavity.

7. The electric machine module of claim 1, wherein a coolant is capable of being dispersed from a coolant inlet, through a coolant passageway, into the coolant jacket, and through the plurality apertures into the machine cavity.

8. The electric machine module of claim 7, wherein the stator comprises stator end turns and the apertures are positioned to disperse the coolant one of substantially onto or substantially near the stator end turns.

9. An electric machine module comprising:
an electric machine including a stator; and
a housing at least partially circumscribing the electric machine, the housing including at least two housing members including a first housing member and a second housing member coupled together and substantially securing the electric machine within the housing, the housing at least partially defining a machine cavity and defining at least a portion of a coolant jacket,
the coolant jacket at least partially defined by an outer surface of the outer diameter of the stator and an inner surface of an inner diameter portion of the first housing member and an inner surface of an inner diameter portion of the second housing member, the coolant jacket covering at least a majority of the outer surface area of the stator and extending continuously across an axial length of the stator to a region substantially adjacent to each axial end of the stator; and
the housing including indentations positioned near axial ends of the stator and substantially along a circumference of the stator, the indentations providing an axial flow path substantially following a portion of an outer diameter of the stator and a radial flow path substantially following a portion of an axial side of the stator, and apertures being formed between the indentations and the stator, the apertures being in fluid communication with the machine cavity and the coolant jacket.

10. The electric machine module of claim 9, wherein each of the at least two housing members includes at least a first inner diameter, a second inner diameter, and a third inner diameter;
the first inner diameter smaller than the outer diameter of the stator and located axially outward from the stator;
the second inner diameter substantially equal to the outer diameter of the stator and located adjacent to axial ends of the stator; and
the third inner diameter larger than the outer diameter of the stator and located substantially radially outward from the stator, wherein a coolant jacket is at least partially defined by the outer diameter of the stator and the third inner diameter of the housing.

11. The electric machine module of claim 9, wherein the first housing member and the second housing member comprise substantially equal axial lengths; and the first housing member and the second housing member are coupled together near a central point along an axial length of the stator.

12. The electric machine module of claim 9 further comprising a drain positioned near the bottom of the machine cavity.

13. The electric machine module of claim 9, wherein a coolant is capable of being dispersed into the coolant jacket and at least a portion of the coolant in the coolant jacket is dispersed through the apertures into the machine cavity.

14. The electric machine module of claim 13, wherein the stator comprises stator end turns and the apertures are positioned to disperse the coolant one of substantially onto or substantially near the stator end turns.

15. A method for assembling an electric machine module, the method comprising:
providing an electric machine including a stator, the stator including stator end turns;
providing a housing defining a machine cavity and at least partially circumscribing the electric machine, the housing comprising at least two housing members including a first housing member and a second housing member coupled together, and at least one of the at least two housing members including a coolant inlet and a coolant passageway;
providing a coolant jacket at least partially defined by an outer surface of the outer diameter of the stator and an inner surface of an inner diameter portion of the first housing member and an inner surface of an inner diameter portion of the second housing member, the coolant jacket covering at least a majority of the outer surface area of the stator and extending substantially continuously across an axial length of the stator to a region substantially adjacent to each axial end of the stator; the coolant passageway fluidly connecting the coolant inlet and the coolant jacket; and
positioning a plurality of apertures substantially circumferentially around the coolant jacket, the plurality of apertures in fluid communication with at least the machine cavity and the coolant jacket, wherein the coolant jacket and the plurality of apertures are configured and arranged to guide at least a portion of a coolant from the coolant inlet through at least a portion of the coolant jacket and into the machine cavity.

16. The method for cooling an electric machine module of claim 15, wherein the plurality of apertures are configured to spray the coolant, at least in part, substantially onto or substantially near the stator end turns.

17. The method for cooling an electric machine module of claim 16, further providing a drain positioned near the bottom of the machine cavity.

* * * * *